June 23, 1953      L. DOREL      2,642,668
GAUGE BLOCK AND HOLDER
Filed Nov. 3, 1948
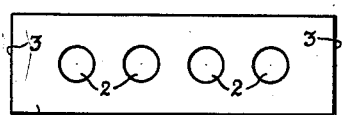
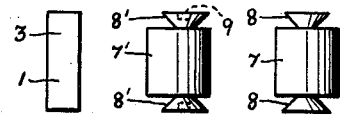
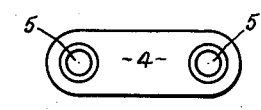
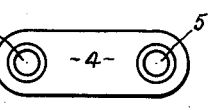
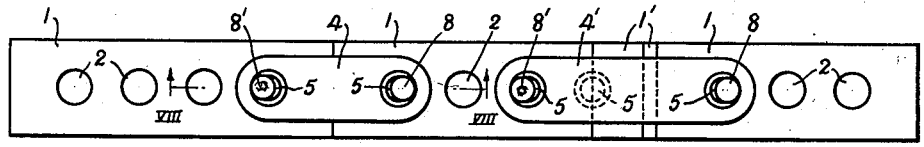
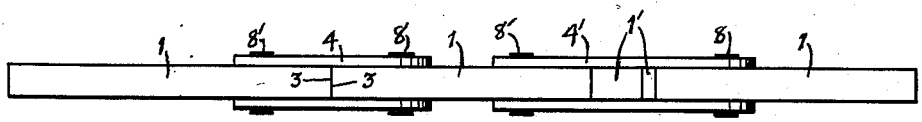
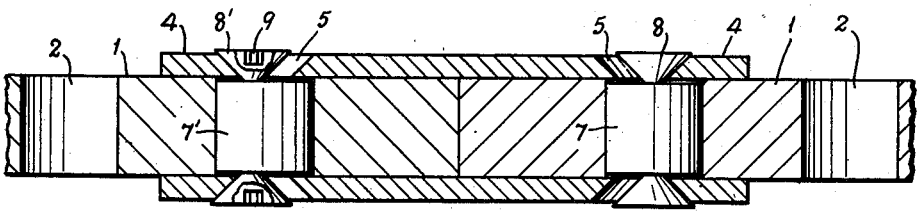
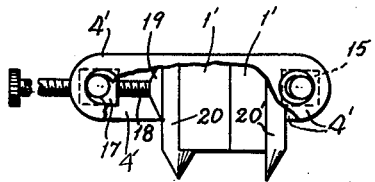
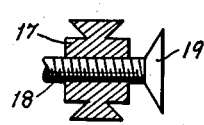
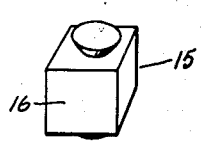
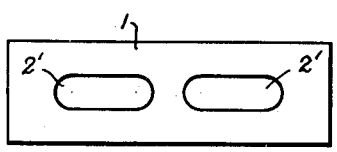
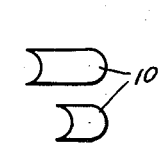
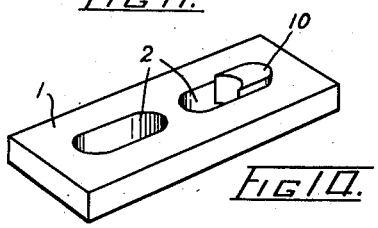
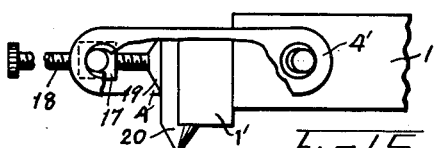
INVENTOR.
LEROY DOREL.
BY
Leon Arthurs
ATT'Y.

Patented June 23, 1953

2,642,668

UNITED STATES PATENT OFFICE 2,642,668

GAUGE BLOCK AND HOLDER

Leroy Dorel, Hamilton, Ontario, Canada

Application November 3, 1948, Serial No. 58,099

3 Claims. (Cl. 33—168)

The invention relates to precision gages and to holders therefor.

The gage contemplated by the invention is the well-known block gage which, as its name implies, consists of a block of suitable material, usually hardened steel, having at least two highly finished flat and parallel facets spaced a micrometrically precise distance apart; these being hereinafter referred to as the facets of the gage.

Such gages are usually furnished in dimensionally graduated sets which may be used to form other measuring standards, not included in the set. This is done by assembling or stacking a number of block gages, the sum total of whose measurements equals that of the desired standard, in facet-to-facet relationship; the accuracy of the individual components of the resulting stack being imparted to the structure.

It will be obvious that when a number of gages are so compiled that some holding means therefor is needed not only to facilitate the handling thereof but also to press them tightly together in order to insure the accuracy of the assembly. In the past, such gages have been combined by wringing, as it is known in the art, wherein a facet of one gage was frictionally applied under pressure to a facet of another gage whereby the two were caused to cling together.

It will be apparent that this method subjected the gages to a great deal of undue friction which utimately not only destroyed their accuracy but also scored them and rendered further wringing ineffective. This method was also impractical for relatively long gage combinations owing to the effects of leverage thereon and, in addition, in view of the lack of handling facilities whereby the heat of the user's hands was communicated directly to the gages causing the expansion and consequent inaccuracy thereof.

Another feature of the prior art was a vise like holder between whose jaws the stack of gages was adapted to be compressed. Herein also there obtained an important disadvantage in that the facets at the ends of the stack were obscured by the jaws and were thus seriously restricted in utility. A still further practice visualized, for example, in Hoke, U. S. 1,472,837, was to provide each gage with an axial hole through which it was skewered on a telescopable screw element adapted to tighten the stack together. In this instance too, important parts of the gaging surfaces of the stack were manifestly rendered useless by the openings therein.

In view of these and many other disadvantages of the prior art which need not be enumerated herein the present invention seeks, as its first objective, to provide a means for so assembling two or more gages that their facets will be fully exposed for testing purposes and that they will not be unduly injured thereby.

It is a further object of the invention to provide a new and improved gage and one which will be especially adapted to cooperate with the instant holder.

It is also an important object of the invention to provide a holder which is economical to make and unobtrusive in use.

A still further object of the invention is to provide a holder such as described wherewith standard gaging accessories may be conveniently utilized.

The foregoing and other objects of the invention will be more fully apparent from the hereinafter following description of the elements, parts and principles thereof; a selected embodiment of the said invention being illustrated, by way of example only, in the annexed drawing wherein:

Fig. 1 is a plan view of the instant gage,

Fig. 2 an end elevational view thereof,

Figs. 3 and 4 side elevational views of parts of the instant holder,

Fig. 5 a plan view of another part of the holder,

Fig. 6 a plan view of a series of gages combined according to the invention,

Fig. 7 a side elevational view of the structure shown in Fig. 6,

Fig. 8 a section along the line VIII—VIII in Fig. 6,

Fig. 9 a plan view with broken out portions of another series of gages and accessories combined according to the invention, Fig. 10 a section through one of the elements in Fig. 9, Fig. 11 a perspective view of another of the elements in Fig. 9, Fig. 12 a plan view of a modified form of the gage shown in Fig. 1, Fig. 13 a plan view of certain parts designed to co-operate with the modified gage shown in Fig. 12, Fig. 14 a perspective view of the gage of Fig. 12 and a part of Fig. 13 in combination, and Fig. 15 a plan view of a detail of the invention broken out portions.

Like reference numerals will refer to like parts of the invention throughout the several views.

Fundamentally, the invention achieves its objectives by means of a holder which is adapted to grip a pair of gages intermediate their faces and is provided with means for pressing them tightly together; other gages or accessories being adapted to be inserted between the two thus gripped.

Although the type of gage selected for exemplary purposes has a rectangular facet, this should not be construed as a limitation since the invention can be readily adapted for use with gages of many other regular shapes. However, it is important that all gages sought to be combined should be identical in every respect except, of course, in the length thereof between facets. Moreover most sets thereof comprise gages in multiples of various units. For example, a set based on the English system of measurement may include a series of gages in steps of one inch; another series in steps of .1"; a still further series in steps of .01", and so forth depending on what is required thereof, and while the several gages are exactly alike in every respect but in size, it will be necessary to divide them into two broad categories as will be described below.

Thus the gage 1 shown in Figs. 1 and 2 of the drawings is rectangular in cross-section and carries a bore 2 at a measured distance from each of its facets 3—3. In actual practice this distance measures about one inch but for the purposes of the instant disclosure will hereinafter be referred to as a "bore distance." Since, as will be readily obvious, some of the gages contemplated will be too small to be bored, these will hence be identified as fractional gages 1'.

The holder per se comprises a pair of elongated elements or link straps 4—4 as they will hereinafter be referred to, whereof each has a counter-sunk opening 5 at each of its ends; the space between openings 5—5 in each link strap 4 being two bore distances. The holder also includes a plug 7 which is co-dimensional with the bores 2, being adapted to fit and turn therein, and terminates in a pair of concentric undercut trunnions 8—8 adapted to be accommodated in link-strap openings 5—5. A second plug 7' is also provided which is identical to the first described with the exception that its trunnions 8'—8' are eccentrically disposed thereon and have turning facilities such as wrench sockets 9—9.

Now to combine a pair of gages 1—1 in close, facet-to-facet, relation, plugs 7—7' are inserted into bores 2—2 respectively adjacent the gage junction, whereby a pair of trunnions 8—8' will be found to project from each side of the said juxtaposed gages 1—1. A link strap 4 arranged to straddle the said junction is then engaged thereon substantially as shown in Figs. 6 and 7 and the plug 7' turned to urge the gages 1—1 together in a well-known manner; the edges of the openings fitting into the trunnion undercuts thus releasably retaining the link strap 4 and preventing the inadvertent disassembly of the parts. Other gages 1 may then be similarly attached to the first two to form a stack of any desired length.

The foregoing represents the most elementary form of the invention. In actual practice, however, various additional facilities are required and are hereinafter described.

For example, it is important to be able to add fractional gages 1' to any combination of gages 1. Very small fractional gages 1', measuring less than the "throw" of the eccentric plug 7', can obviously be inserted and retained between any pair of gages 1—1 joined by the instant holder. However, it may undoubtedly prove necessary to add gages 1' to the stack which are larger than the combined "throws" of even two plugs 7'—7', if two be used. For this purpose, a longer link strap 4' is provided which is, say three or four bore distances long between opening 5—5, whereby a relatively large fractional gage 1' may be retained between two gages 1—1. Furthermore, to permit the two gages 1—1 to be joined by a longer link strap 4' without an intervening gage 1', additional bores 2 may be formed therein at a suitable distance from those first described. Alternately one or more suitably spaced intermediate openings 5 may be formed in each link strap 4' substantially as shown by the dotted lines in Fig. 6.

Still another means of achieving the same objective is disclosed in Figs. 12, 13 and 14. Herein the gage bores 2' are elongated and, for co-operation therewith, there are provided spacers 10 of corresponding shape and in various sizes which are adapted to fit into the bores 2' to vary the length thereof according to the size of the fractional gage 1' required to be incorporated in the stack.

It has already been stated that one of the foremost principles of the invention is to hold gages by their intermediate portions and thus leave their end facets fully exposed for testing purposes. This manifestly, can only be done with gages beyond a certain minimum size, namely the gages 1. However, fractional gages 1' alone can also be held by the instant holder although without full benefit of the advantages inherent in the invention.

For this purpose there are provided a trunnioned end-abutment 15, which is very much like the plug 7 with the exception that it has at least one flat face 16, and a second end-abutment 17 which is identical to the first with the exception that it has an adjustment screw 18 terminating in a pressure plate 19.

As shown in Fig. 9 the end abutments 15 and 17 are combined with a pair of longer link straps 4'—4' and a number of fractional gages 1' inserted and compressed between the pressure plate 19 and end abutment 15. This view and Fig. 15 also reveal the presently contemplated method of enabling gaging accessories 20—20' to be used with the invention.

For the sake of brevity and clarity in the foregoing description thereof, the full versatility of the invention has neither been specifically related nor illustrated; nor have the many advantages thereof been particularly outlined. As one example thereof, it is pointed out that the fact that it is bored not only lessens the weight of the gage 1 but also enables it to receive a removable heat insulating handle. Nevertheless, it is felt that the full scope of the invention will be readily apparent to those in the art from the precedent brief description and from the hereinafter following claims.

What I claim as my invention is:

1. A holder for aligned gages having bores comprising a pair of plugs adapted to be accommodated respectively in a bore in each of a pair of gages with the ends of the plugs projecting therefrom, and a pair of elongated elements adapted to retainably engage and link the corresponding ends of the said plugs.

2. In a gage set, the combination of a gage having facets and a plurality of more than two bores uniformly spaced from each other and the said facets; a plug adapted to be rotatably accommodated in one of the said bores; a second gage having facets and bores between the facets; a plug adapted to be rotatably accommodated in one of the bores; a pair of elongated elements having an opening at each end wherein an end of a plug is releasably retainable, the spacing between the openings in the said elongated elements being equivalent, at least, to the spacing between 3 of the bores in the aforementioned first gage.

3. In a holder for aligned gages, the combination which includes, a pair of plugs having intermediate cylindrical portions; an undercut trunnion projecting from each end of each plug, the trunnions on one, at least, of the plugs being eccentric to the intermediate cylindrical portion thereof, and a pair of elongated elements having countersunk openings at their ends through which the trunnions are adapted to be inserted; the edges of the said countersunk openings in the elongated elements being receivable into the undercut carried by the trunnion.

LEROY DOREL.

References Cited in the file of this patent

UNITED STATES PATENTS

| Number | Name | Date |
|---|---|---|
| 705,701 | Petsche | July 29, 1902 |
| 724,116 | Maley | Mar. 31, 1903 |
| 870,997 | Sauer | Nov. 12, 1907 |
| 1,397,189 | Westerberg | Nov. 15, 1921 |
| 1,491,100 | Hoke | Apr. 22, 1924 |
| 1,631,237 | Wilmot | June 7, 1927 |
| 2,105,054 | Posthuma | Jan. 11, 1938 |
| 2,119,880 | Horton | June 7, 1938 |
| 2,409,817 | Webber | Oct. 22, 1946 |
| 2,417,150 | Berry | Mar. 11, 1947 |
| 2,447,889 | Adler | Aug. 24, 1948 |

FOREIGN PATENTS

| Number | Country | Date |
|---|---|---|
| 362,915 | Germany | Nov. 3, 1922 |